July 7, 1964   G. K. WILLECKE   3,140,458
ELECTRICAL INDUCTIVE DEVICE AND METHOD OF MAKING THE SAME
Filed Aug. 5, 1957
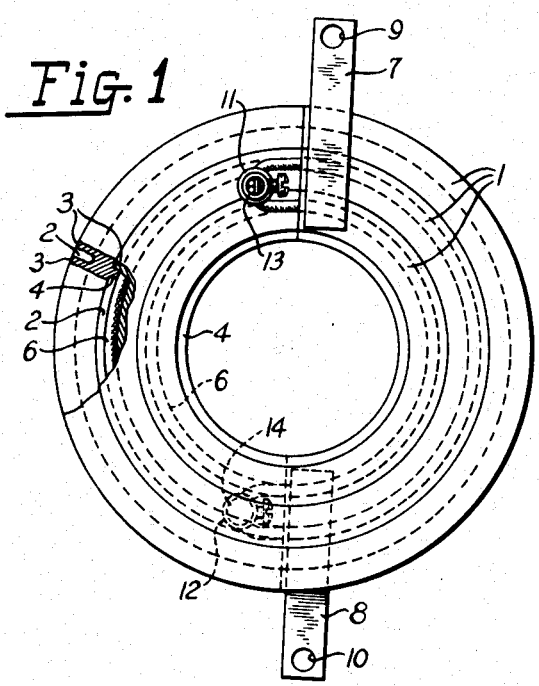
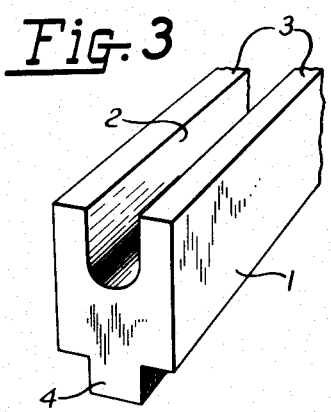
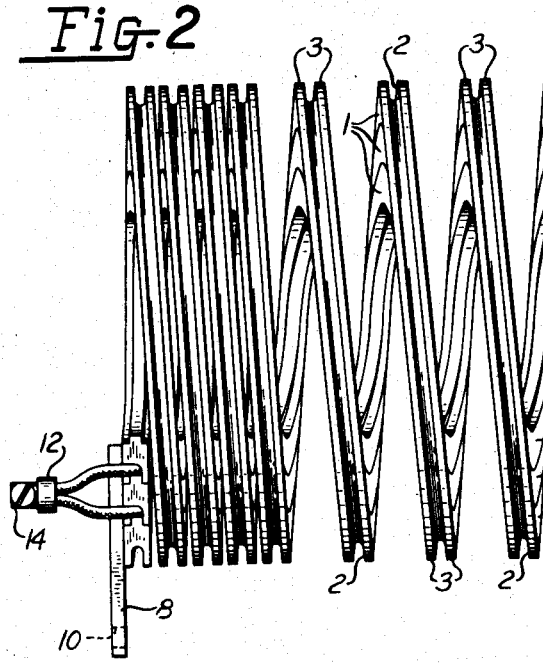
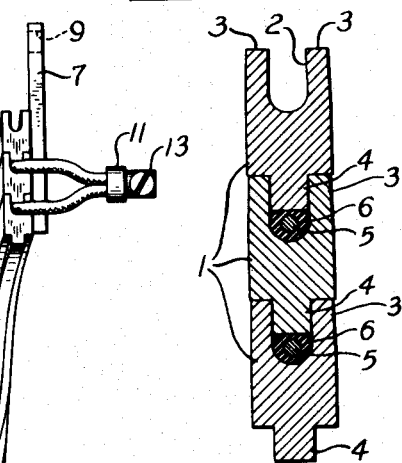
INVENTOR.
GERHARD K. WILLECKE
BY
Andrus, Sceales & Starke
Attorneys

United States Patent Office 3,140,458
Patented July 7, 1964

3,140,458
ELECTRICAL INDUCTIVE DEVICE AND METHOD OF MAKING THE SAME
Gerhard K. Willecke, Appleton, Wis., assignor to Miller Electric Manufacturing Company, Appleton, Wis., a corporation of Wisconsin
Filed Aug. 5, 1957, Ser. No. 676,240
9 Claims. (Cl. 336—195)

This invention relates to an inductive coupling device such as air core transformers and particularly to such a device which is adapted for use at radio frequencies.

Transformers and coupling devices of this variety frequently require a very high efficiency for the transfer of electric power from one winding or circuit to the other. Consequently, the coupled windings must have very close coupling.

This invention has its greatest application in those circuits where it is desirable to introduce radio frequencies into a circuit required to carry heavy currents such as in arc welding and the like.

In high frequency auxiliary circuits for arc welding circuits and the like, the secondary winding of the radio frequency coupling transformer is serially connected in the arc welding circuit. The winding therefore carries the heavy welding current and must be a relatively heavy conductor. Further, the high welding current in the winding establishes large magnetic stresses and secure mounting of the coupled windings is required.

The present invention provides an air core transformer or the like having very close coupling and a high efficiency. The apparatus is simply and easily constructed in accordance with the present invention and is mechanically very rigid and has high heat radiation capacity.

In accordance with the present invention, one winding of the air core transformer is extruded or otherwise shaped from copper, aluminum or other suitable conductive material to serve as a winding form and as a support for the other winding of the transformer. The winding is originally formed as a solid, straight conductor of a sufficient length to form a continuous helical winding. The solid bar-like conductor is provided with an upper slot or raceway to receive a single conductor, properly insulated from the solid bar, to form an air coupled transformer.

The inserted conductor and the slot of the bar-like conductor have substantially the same lateral dimension such that the bar serves as a winding form for the conductor and in the completed helically wound transformer serves as the winding support for the inserted conductor.

In another aspect of the invention, a projection is provided on the surface of the straight bar-like conductor opposite the slot.

The projection is slightly less in depth than the slot and has substantially the same lateral dimension. A plurality of the bars are disposed in stacked relation with the projections of the outer bars disposed within the slots of the immediately adjacent inner bar. The stacked conductors are helically coiled with the slot being on the radially outer edge of the conductor and the projection on the radially inner edge of the conductor. The sides of the slot are placed under tension by the coiling of the conductors and tend to collapse into the slots and toward the cooperating projection. The projection on the other hand is on the inner edge of the bars and therefore is under a compressive force which tends to laterally expand the projection. Consequently, with the projection tending to expand outwardly and the adjacent sides of the slot tending to collapse inwardly, the adjacent conductors are tightly and rigidly interlocked.

As the projection is of a lesser depth than the slot, a winding passage is formed within the base of the recess and the other winding is carried thereby. The second winding, properly insulated from the first winding, may be inserted within the passage either before or after the solid conductors are spirally wound into the final coil. In accordance with the second aspect of the invention, the inserted winding within the slot or raceway may consist of a plurality of turns.

If the second winding is inserted within the slot of the conductor prior to assembly with the other conductors and the coiling thereof, the cooperating slot and projection may be formed such as to tightly clamp the inserted winding within the passage and establish maximum coupling.

The slot sides and the projection of each conductor serve as strengthening braces and increase the strength of the conductor without increasing the weight thereof. This provides a self-supporting coil which will not buckle or sag even though supported at the axial ends of the completed coil with the coil axis lying in a horizontal direction. Further, the outermost slot and the inner projection provide an increased heat radiating surface for cooling the winding.

By providing a strap-like connection, secured to the sides of the ends of the conductors, by welding, brazing or other suitable means, the superposed conductors are simply and easily connected in parallel.

This invention provides a simple, inexpensive air core transformer of a very rigid and stable construction.

The drawing furnished herewith illustrates the best mode presently contemplated for carrying out the invention.

In the drawings:

FIGURE 1 is an end elevational view with parts broken away to clearly illustrate an air core transformer constructed in accordance with the present invention;

FIG. 2 is a front elevational view of the transformer in FIG. 1 with portions thereof expanded to more clearly illustrate the invention;

FIG. 3 is a perspective fragmentary view of a straight solid winding employed in the transformer illustrated in FIGS. 1 and 2; and FIG. 4 is an enlarged cross-sectional view of one turn of the transformer winding.

Referring to the drawing and particularly FIGS. 1 and 2, an air coupled transformer is shown having a secondary coil including three solid strap-like conductors 1 identical in construction and disposed in radially edge-stacked relation to form a strip-like conductor which is spirally wound on an edge thereof to form a continuous helical coil. A longitudinal slot 2 is formed in the outer peripheral edge of each conductor 1 and forms a pair of thin radial lips 3. On the inner edge or periphery of each conductor, a radial projection 4 is integrally formed and is located centrally of the edge in lateral alignment with the slot 2. The lateral width of the recess 2 and the projection 4 is substantially the same such that the projection 4 may be extended into the recess 2. However, the radial depth of each projection 4 is less than the radial depth of the slot 2. In the present embodiment of the invention, the projection 4 is approximately one-half the depth of the slot 2 and each slot receives a primary conductor 5 shown for illustrative purposes as a solid round conductor. An outer insulating casing 6 surrounds the primary conductor to insulate the primary conductor 5 from the secondary winding.

Each strap conductor 1 and the associated primary conductor 5 forms a unity coupled air core transformer. The strap conductors 1 are secured together at the opposite axial ends of the coil by secondary circuit connectors 7 and 8 respectively. The connectors 7 and 8 are welded, brazed or otherwise secured in good electrical contact to the axial end surface of each of the individual conductors 1 and connect all of the conductors in parallel. Openings 9 and 10 are provided in the respective connectors 7 and 8 for connecting the transformer conductors 1 to the welding circuit or the like, not shown.

Each of the primary conductors 5 extends outwardly from the ends of the corresponding secondary conductor 1 and are joined together by suitable primary circuit connectors 11 and 12, respectively, in any suitable manner as by brazing or soldering. The connectors 11 and 12 connect the primary conductors 5 in parallel with each other. Sleeve and setscrew terminals 13 and 14 are shown on the corresponding connectors 11 and 12 to permit connection of the primary conductors 5 to a power source, not shown.

In fabricating the transformer illustrated in FIGS. 1 and 2, the secondary coil conductors 1 are originally formed into a straight bar or rod-like member of a generally rectangular cross-section having a major dimension and a minor dimension. The slot 2 and projection 4 are formed on the opposite narrow edges of each member as shown in FIG. 3. Each rod-like member is preferably formed by extruding aluminum because of the commercial practibility thereof. The bar may be formed from any other suitable conductive material and by any other suitable metal working operation such as forging or cutting.

Each straight rod-like member is formed of at least a sufficient length to provide a continuous strap conductor 1 in the transformer. The member may be substantially longer than the length of each conductor 1 and the desired lengths cut from the long stock as a particular design requires. The required number of members is stacked one upon another with the projection 4 completely extending into the slot 2 of the adjacent member. The number of members required will be determined by the total current carrying capacity of the winding which is to be employed. The stacked members are then helically wound upon the free edge containing the projection 4 to form the strip-like secondary winding, as shown in FIGS. 1 and 2. A suitable winding form, not shown, having a helical groove to accommodate projection 4 may be employed to provide an even given inner and outer peripheral contour to the completed transformer.

The primary conductors 5 may be inserted into each slot 2 in the rod-like members before the latter are disposed in stacked relation and coiled therewith. The primary conductors 5 may also be threaded into the passage formed between a cooperating slot 2 and projection 4 subsequent to the spiral winding of the members to form the coiled conductors 1.

During the spiral winding of the stacked members, the metal in each of the projections 4 is under a compressive force and tends to expand laterally. Simultaneously, the thin lips 3 forming the slot 2 are under tension due to stretching of the metal and they tend to collapse laterally inwardly into the slot. Consequently, the lips 2 of each conductor 1 tightly grip the laterally expanded projection 4 and rigidly lock the stacked conductors together as shown in FIG. 4.

The interlock between the individual conductors 1 provides a good mechanical joint therebetween and good transfer of heat from one conductor to the next. This eliminates establishments of hot spots within the winding.

The innermost projection 4 and the outermost pair of lips 3 establish a large heat radiating surface which may be disposed in the path of cooling air or the like. This increases the current carrying capacity of the secondary winding. Consequently, the winding may be designed with less material for any given current.

The present invention provides a plurality of simply formed conductors which may be rigidly interlocked to carry a heavy current and which provides a coil winding form and a coil support for receiving an air coupled winding.

Various modes of the invention are contemplated as being within the scope of the following claims particularly pointing out and distinctly claiming the subject matter which is regarded as the invention.

I claim:

1. In the method of forming a transformer having a relatively heavy current carrying winding spirally wound in the form of a coil, extruding aluminum into a plurality of like rod-like members at least of a length equal to the final length of the heavy winding, each said member having a slot extending longitudinally of the entire member having a corresponding projection opposite the slot and of less depth than said slot, disposing at least two of said extruded members in stacked relation with the projection of one member protruding into the slot of the other member, and spirally winding the stacked members with the projections thereof facing radially inward and the slots thereof facing radially outward to effect a clamping action between said mating projection and the sides of the slots.

2. The method of forming a transformer winding from a plurality of bar members each having oppositely disposed and longitudinally extending slots and projections of corresponding width, said slots being deeper than the projections, which comprises assemblying a plurality of the members in superposed relation with projections and slots of adjacent members in mating relation, disposing an insulated conductor within the opening defined by each mating slot and projection, and spirally coiling the stacked members with the slots and projections extending generally in a radial direction to tightly lock the members together and to lock said insulated conductor in close coupled relation to said members.

3. The method of forming a transformer winding from a plurality of bar members each having oppositely disposed and longitudinally extending slots and projections of corresponding width and having the slots deeper than the projections, which comprises assembling a plurality of the members in superposed relation with projections and slots of adjacent members in mating relation to form a strip-like conductor, spirally winding the superposed members about the edge of the free projection to form a helical coil and effect an interlock between the sides of each recess and mating projection, and threading an insulated conductor through each passage defined by a mating slot and projection.

4. The method of forming a transformer winding from a plurality of bar-like conductors each having a longitudinally extending slot and projection on opposite surfaces, said projection being shorter than said slot and of substantially the same width, superposing at least two of said bar-like conductors with a mating slot and projection in adjacent bars to provide a predetermined current carrying capacity, spirally winding said superposed conductors on the projection to establish a rigid interlock between the sides of each slot and mating projection with a spiral passage formed within each slot, said passage being adapted to carry and support a winding, and securing strap connectors to the axial end surfaces of the coil adjacent the ends of the conductors to allow connection in a circuit, said strap connectors extending radially coextensive with the conductors to connect the conductors in parallel 5. In a transformer, a solid conductor having a generally rectangular cross-section, said conductor being spirally wound to provide a self-supporting coil, a winding groove in the outer peripheral edge of the conductor, a winding disposed entirely within the groove for coupling, and a projection on the inner peripheral edge of the conductor, said projection and sides of the groove strengthening said conductor and increasing the heat radiating surface thereof.

6. A transformer comprising a coil of bar stock having a continuous groove in its outer peripheral surface and constituting one winding of the transformer, a second winding layed entirely within said groove and insulated from said first winding, and a conductive closure for said groove having an inwardly projecting tongue fitting tightly in the groove to constitute a part of said first winding and confining said second winding therein.

7. The method of making an inductive coupling device comprising extruding bar stock of conductive metal and having a longitudinal groove on one side thereof and a corresponding tongue of less depth on the side opposite said groove to provide at least two like bar members adapted to be joined by a tongue and groove interlock to constitute one conductor, providing a second conductor adapted to fit entirely within said groove with insulation therebetween, and winding said members in radially stacked relation spirally axially along a winding form with said second conductor in said groove and beneath said tongue.

8. In an inductive coupling device of the class described, a conductive winding comprising a coil of radially stacked bars interlocked continuously by tongue and groove members integral of the bars, and a second conductive winding confined continuously at the bottom of tre groove between two adjacent bars and insulated from said first winding.

9. In an inductive coupling device of the class described, a conductive winding comprising a coil of radially stacked bars interlocked continuously by tongue and groove members integral of the bars with the tongue extending radially inward of the outer stacked bar and the groove facing radially outward of the next inner adjacent bar to receive the tongue, and a second conductive winding confined continuously at the bottom of said groove by the corresponding tongue and insulated from said first winding.

References Cited in the file of this patent

UNITED STATES PATENTS

| | | |
|---|---|---|
| 931,445 | Low | Aug. 17, 1909 |
| 1,692,529 | Zagorski | Nov. 20, 1928 |
| 1,802,302 | Zagorski | Apr. 21, 1931 |
| 1,837,413 | Dobson | Dec. 22, 1931 |
| 2,599,182 | Kerns | June 3, 1952 |

FOREIGN PATENTS

| | | |
|---|---|---|
| 515,865 | Germany | Jan. 26, 1928 |